Nov. 7, 1950  K. B. KIER  2,529,162
VEHICLE SUSPENSION SYSTEM
Filed Nov. 26, 1948  2 Sheets-Sheet 2
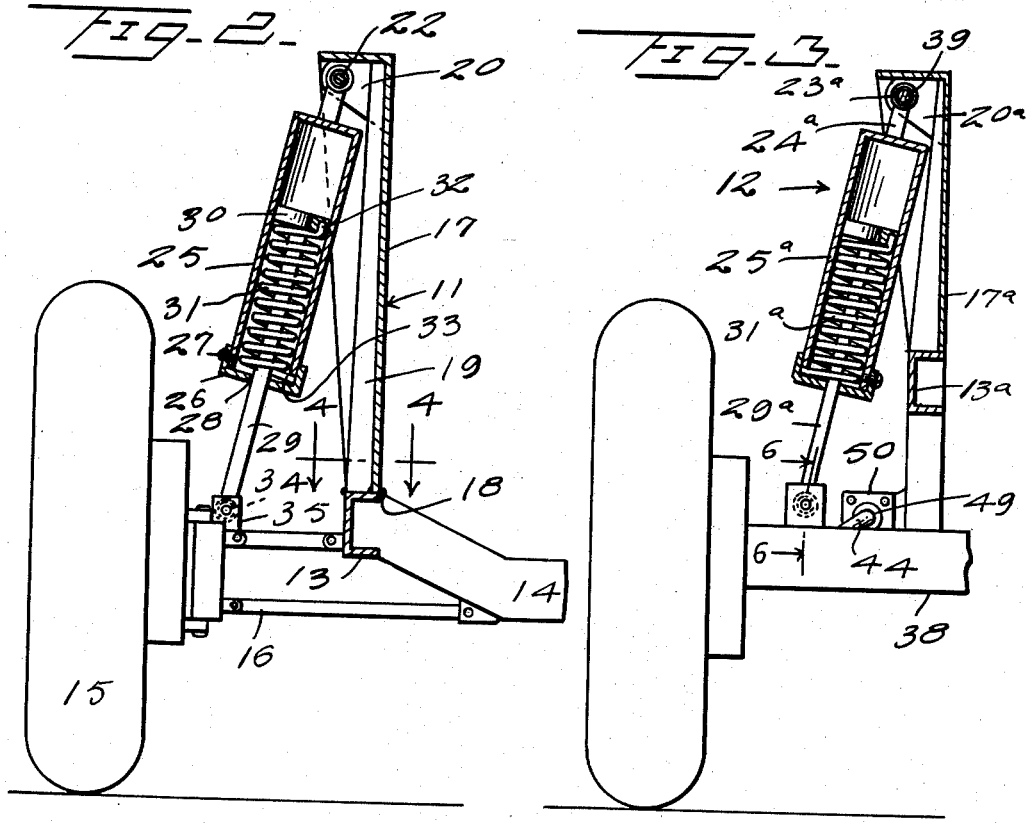
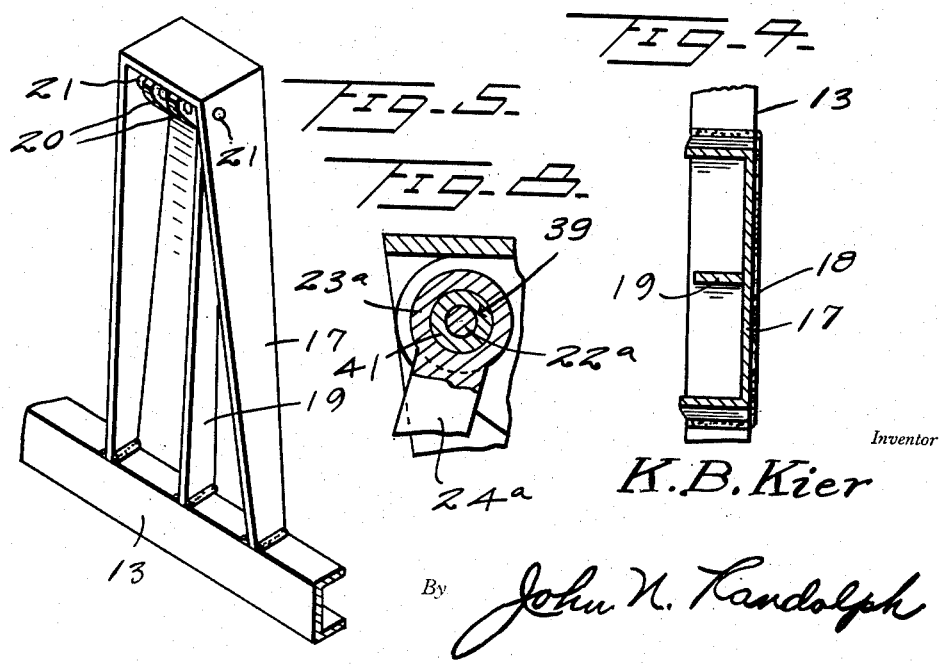
Inventor
K. B. Kier
By John N. Randolph
Attorney Patented Nov. 7, 1950

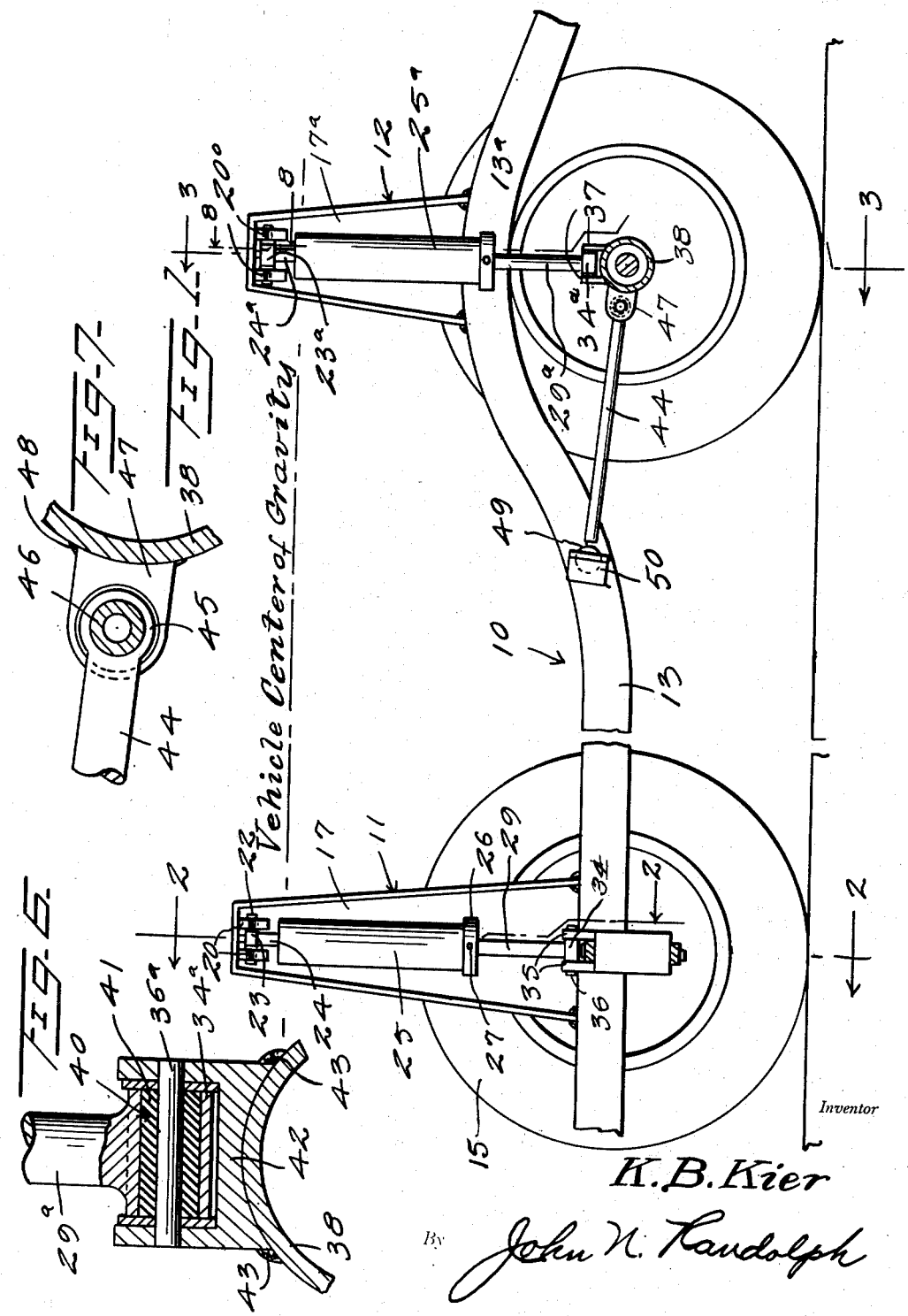

2,529,162

UNITED STATES PATENT OFFICE 2,529,162

VEHICLE SUSPENSION SYSTEM

Kenneth B. Kier, Middletown, Pa.

Application November 26, 1948, Serial No. 61,990

2 Claims. (Cl. 280—124)

1

This invention relates to a novel vehicle suspension system adapted to replace conventional standard spring suspension systems of the types utilizing coil springs, leaf springs or combinations thereof for providing a separate yieldable suspension for each of the four wheels of the vehicle.

It is a primary object of the present invention to provide a suspension system having a unit for each of the four wheels of the vehicle and which units are each connected to the vehicle frame or chassis above the center of gravity of the vehicle to cause the vehicle to incline or bank toward the direction of a turn instead of tilting in the opposite direction and toward the outside of the turn in response to centrifugal force as occurs with conventional vehicle suspension systems.

Another object of the invention is to provide a suspension system which is attached to the vehicle frame or chassis above the vehicle center of gravity to eliminate the unpleasant sensation experienced by passengers in making turns and which will increase the stability of the vehicle to resist overturning as well as tendencies of the vehicle to skid.

Various other objects and advantages of the invention will hereinafter become more fully apparent from the following description of the drawings, illustrating a preferred embodiment thereof, and wherein:

Figure 1 is a fragmentary side elevational view, partly in section, of a portion of a vehicle frame or chassis and showing the suspension unit applied to the front and rear wheels thereof;

Figure 2 is a transverse sectional view, partly in side elevation of one of the front wheel suspension units taken on the line 2—2 of Figure 1;

Figure 3 is a similar view of one of the rear wheel suspension units taken on the line 3—3 of Figure 1;

Figure 4 is a horizontal sectional view taken substantially along a plane as indicated by the line 4—4 of Figure 2;

Figure 5 is a perspective view of a portion of one of the front wheel suspension units;

Figure 6 is a substantially vertical sectional view taken substantially along a plane as indicated by the line 6—6 of Figure 3;

Figure 7 is a vertical sectional view of another portion of the rear wheel suspension unit, and Figure 8 is an enlarged vertical sectional view taken substantially along a plane as indicated by the line 8—8 of Figure 1.

Referring more specifically to the drawings, the novel vehicle suspension system in its entirety is designated generally 10 and includes a pair of

2 corresponding front wheel suspension units only one of which is shown and designated generally 11 and a pair of corresponding rear wheel suspension units, one of which only is illustrated and which is designated generally 12. The units 11 and 12 are in many respects identical.

In Figure 1 the front wheel and rear wheel suspension units 11 and 12 are each illustrated in conjunction with certain of the parts only of a conventional motor vehicle and wherein the near front and rear wheels have been omitted. The motor vehicle frame or chassis includes a conventional side frame member 13 and a front transverse frame member 14. Each of the front wheels 15 of the vehicle is shown attached to the frame members 13 and 14 by a conventional "knee action" mounting 16.

Referring particularly to Figure 2, the front suspension unit 11 includes a mounting standard 17 which is welded or otherwise suitably secured as seen at 18 at its lower end to the side member 13 of the frame or chassis and which rises therefrom and is normally disposed in an upright position. The mounting standard 17 is of channel-shape construction in cross section and disposed to open outwardly and is provided with a reinforcing web 19 which is disposed between the side flanges thereof and which diminishes in width toward its upper end. The upper end of the standard 17 is provided with a pair of spaced ears 20 which are disposed between the side flanges thereof and which are provided with aligned apertures which register with larger openings 21 in the side flanges of the standard 17 through which a pivot pin, which engages the apertures of the ears 20 may be applied and removed. Said pivot pin or bolt 22 forms a part of a conventional lubricated bronze bearing which engages rotatably in the eye 23 formed transversely of the upper end of a rod 24, as best seen in Figure 1. The rod 24 forms an extension of the upper, closed end of a cylinder or sleeve 25 which is thus swingably supported on the standard 17 and which has an open lower end which is normally closed by a cap or closure 26 which may be retained in an applied position in any suitable manner as by means of a setscrew 27. The cap or closure 26 is provided with a central opening 28 through which a rod 29 extends reciprocally. The rod 29 is provided at its upper end with a head 30 which is slidably disposed in the sleeve or cylinder 25 to form a guide for the upper end of said rod, the lower end of which is guided in the opening 28. A contractile type coil spring 31 is secured at its upper end as seen at 32 in the head 30 and has its lower end anchored at 33 between the cap and cylinder for normally urging the rod 29 downwardly in the cylinder 25. The rod 29 has a transversely disposed eye 34 at its lower end which is disposed between a pair of upstanding apertured ears 35 which are secured to the outer portion of the knee action unit 16 for receiving a pivot pin or bolt 36 which extends through said eye and through the apertures of the ears 35 and which forms a part of a lubricated bronze bearing of a conventional type. As clearly illustrated in Figure 2, the rod 29 and cylinder 25 extend upwardly and inwardly with respect to the standard 17.

The rear wheel suspension unit 12, as best illustrated in Figures 1 and 3, includes a standard 17a of the same construction as the standard 17 and which differs therefrom only in that the standard 17a is shorter due to the fact that it is mounted on the upwardly offset or arched portion 13a of the longitudinal frame member 13. The ears 20a of the standard 17a are disposed in the same horizontal plane as the ears 20 and above the center of gravity of the vehicle on which the suspension unit 10 is mounted. A cylinder 25a of the suspension unit 12 corresponds with the cylinder 25, including its rod 29a. A pair of upstanding ears 37 are secured to the rear axle housing 38, in any suitable manner as by welding, and project upwardly therefrom and are disposed outwardly of the standard 17a and substantially in longitudinal alignment with the ears 35 located at the same side of the vehicle. In lieu of the bolt or pin 22 and a lubricated bronze bearing, the eye 23a of the rod 24a is pivotally connected to the ears 20a by a torsion mounting, designated generally 39 and best illustrated in Figure 8. Likewise, the eye 34a of the rod 29a is similarly connected to the ears 37 by a torsion mounting, designated generally 40 and illustrated in Figure 6.

The torsion mountings 39 and 40 each include a rubber sleeve 41 which is bonded either to the eye 23a and also to the pin or bolt 22a or to the eye 34a and the pin or bolt 36a. In the rear suspension unit 12, the pin 22a is fixed to the ears 20a and the pin 36a is fixed to the ears 37 which, as seen in Figure 6, are provided with an integral base 42 which is welded or otherwise secured to the axle housing 38, as seen at 43. Accordingly, the pivotal movement of the cylinder 25a relatively to the standard 17a is afforded solely by the yieldability of the upper rubber sleeve 41 and the same applies to the pivotal movement of the rod 29a relatively to the ears 37.

To maintain the rear axle housing 38 in a position transversely of the longitudinal axis of the vehicle frame, which is normally accomplished by the leaf spring, each rear suspension unit 12 is provided with a brace rod 44 having an eye 45 at its rear end which is connected by a similar torsional mounting 46 to a pair of forwardly projecting ears 47 which are welded or otherwise secured as seen at 48 to the rear axle housing 38. Each brace rod 44 is provided with a spherical forward end 49 which is turnably mounted in a sectional socket 50, secured to the outer side of the adjacent longitudinal frame member 13, forwardly of the rear axle housing 38.

The cylinders or sleeves 25 and 25a are preferably approximately sixteen and one-half inches in length and with an inside diameter of approximately three inches. The springs 31 and 31a of said cylinders 25 and 25a, respectively, under a maximum load and with the vehicle motionless are preferably about ten inches in length to allow a maximum extension of the springs of about six inches to take care of any road condition.

From the foregoing it will be readily apparent that the sides of the vehicle frame will be yieldably supported relatively to the wheels by the suspension units 11 and 12 and due to the fact that said units are connected to the frames by the standards 17 and 17a above the horizontal plane of the center of gravity of the vehicle, it will be readily obvious that the springs 31 and 31a will yieldably resist any tendency of the vehicle to tilt laterally from an upright position and due to the fact that the force of said springs is exerted on the vehicle body above its center of gravity, a tendency of the vehicle to tilt in response to centrifugal force will be substantially eliminated thereby minimizing the danger of over turning or skidding in making sharp turns or turns at relatively high speeds.

While the suspension system 10 is primarily adapted for application to new motor vehicles when manufactured, it will be readily apparent that it could be substituted for the conventional coil and leaf spring mountings now in common use.

It will also be readily apparent that changes in dimensions and the proportions of the various parts will of necessity be resorted to for accommodating the suspension system in various makes of motor vehicles.

Various other modifications and changes are contemplated and may obviously be resorted to, without departing from the spirit or scope of the invention as hereinafter defined by the appended claims.

I claim as my invention:

1. In a vehicle suspension unit, a mounting standard fixed to and rising from a side member of a vehicle frame or chassis, a connecting member formed of telescopic sections pivotally connected to the standard adjacent its upper end and having a lower end pivotally connected to a wheel mounting of the vehicle, and spring means for yieldably urging said telescoping sections toward extended positions for yieldably supporting a portion of the frame or chassis relatively to an adjacent ground wheel, said connecting member including a cylinder having a closed upper end provided with an extension pivotally connected to the standard, a detachable closure for the lower, opposite end of said cylinder having a central guide opening, said cylinder forming one of the telescoping sections, a rod forming the other telescoping section extending reciprocally through the closure opening and having a head on its upper end slidably engaging in the cylinder, said spring means comprising a contractile coiled spring disposed in the lower portion of the cylinder having its upper end anchored to said head and its lower end anchored to the closure.

2. In a vehicle suspension unit, a mounting standard fixed to and rising from a side member of a vehicle frame or chassis, a connecting member formed of telescopic sections pivotally connected to the standard adjacent its upper end and having a lower end pivotally connected to a wheel mounting of the vehicle, and spring means for yieldably urging said telescoping sections toward extended positions for yieldably supporting a portion of the frame or chassis relatively to an adjacent ground wheel, said connecting member including a cylinder having a closed upper end provided with an extension pivotally connected to the standard, a detachable closure for the lower, opposite end of said cylinder having a central guide opening, said cylinder forming one of the telescoping sections, a rod forming the other telescoping section extending reciprocally through the closure opening and having a head on its upper end slidably engaging in the cylinder, said spring means comprising a contractile coiled spring disposed in the lower portion of the cylinder having its upper end anchored to said head and its lower end anchored to the closure, said spring normally supporting the upper closed end of the cylinder at a considerable distance above said head.

KENNETH B. KIER.

REFERENCES CITED

The following references are of record in the file of this patent:

UNITED STATES PATENTS

| Number | Name | Date |
|---|---|---|
| 1,888,989 | Kratky | Nov. 29, 1932 |
| 2,039,041 | Wall | Apr. 28, 1936 |
| 2,045,027 | Sanford | June 23, 1936 |
| 2,164,470 | Opolo | July 4, 1939 |
| 2,350,037 | Hofheins et al. | May 30, 1944 |
| 2,496,428 | Avila | Feb. 7, 1950 |

FOREIGN PATENTS

| Number | Country | Date |
|---|---|---|
| 244,921 | Italy | Mar. 29, 1926 |
| 689,203 | France | May 26, 1930 |
| 40,816 | France | May 17, 1932 |